(12) United States Patent
Kodama et al.

(10) Patent No.: US 10,807,830 B2
(45) Date of Patent: Oct. 20, 2020

(54) WINDING CORE AND ROLL

(71) Applicant: HITACHI CHEMICAL COMPANY, LTD., Tokyo (JP)

(72) Inventors: Megumi Kodama, Ichihara (JP); Takahiro Tokuyasu, Ichihara (JP); Shouta Sugai, Ichihara (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 1035 days.

(21) Appl. No.: 14/403,588

(22) PCT Filed: May 24, 2013

(86) PCT No.: PCT/JP2013/064476
§ 371 (c)(1),
(2) Date: Nov. 25, 2014

(87) PCT Pub. No.: WO2013/176252
PCT Pub. Date: Nov. 28, 2013

(65) Prior Publication Data
US 2015/0129706 A1    May 14, 2015

(30) Foreign Application Priority Data
May 25, 2012  (JP) .................................. 2012-119369

(51) Int. Cl.
*B65H 75/10* (2006.01)
*C09J 7/20* (2018.01)

(52) U.S. Cl.
CPC ................ *B65H 75/10* (2013.01); *C09J 7/20* (2018.01)

(58) Field of Classification Search
CPC .................................... B65H 75/10; C09J 7/02
See application file for complete search history.

(56) References Cited

FOREIGN PATENT DOCUMENTS

| CN | 101486850 A | 7/2009 |
|---|---|---|
| CN | 102227482 A | 10/2011 |
| JP | 2006-082953 | 3/2006 |
| JP | 2007-002173 | 1/2007 |
| JP | 2010-163577 | 7/2010 |
| JP | 2010-177401 | 8/2010 |
| JP | 2010-192856 | 9/2010 |
| JP | 2011-187595 | 9/2011 |
| JP | 2011-201634 | 10/2011 |

(Continued)

OTHER PUBLICATIONS

Machine Translation of JP2007002173, dated May 11, 2017.*

(Continued)

*Primary Examiner* — Patricia L. Nordmeyer
(74) *Attorney, Agent, or Firm* — Fitch, Even, Tabin & Flannery, LLP (57) ABSTRACT

Provided is a winding core which has a cylindrical shape and on which an adhesive tape, formed by an adhesive layer formed on an elongated base film in the longitudinal direction of the base film, is wound as multiple layers, wherein the outer diameter of the winding core is a dimension in which a deviation amount of the adhesive layer in the circumferential direction of the winding core between adjacent inner and outer tape portions of the adhesive tape in the radial direction of the winding core becomes 55 mm or less when the adhesive tape is wound on the winding core.

10 Claims, 7 Drawing Sheets

(56) References Cited

FOREIGN PATENT DOCUMENTS

JP         2012-049474        3/2012
TW              I303454 B     11/2008

OTHER PUBLICATIONS

Office Action of counterpart CN Patent Application No. 201380027215.6 dated Nov. 15, 2016.
Office Action of CN Appln. No. 201380027215.6 dated Jul. 31, 2015.
International Search Report of Appln. No. PCT/JP2013/064476 dated Aug. 27, 2013 in English.
International Preliminary Report of Appln. No. PCT/JP2013/064476 dated Dec. 4, 2014 in English.
Taiwanese Patent Office Office Action dated Dec. 15, 2015, from corresponding Taiwanese Patent Application 102118454, 6 pages.

* cited by examiner

WINDING CORE AND ROLL

TECHNICAL FIELD

The present invention relates to a winding core on which an adhesive tape is wound and a roll in which an adhesive tape is wound on the winding core.

BACKGROUND ART

A semiconductor device is produced in a manner such that a wafer is diced into small chips and the small chips are bonded to a substrate or the like. In the production of the semiconductor device, a dicing tape for supporting the small chips is used when the wafer is diced into small chips and a die-bonding film for sticking the small chips is used.

In recent years, a dicing/die-bonding tape having a function of a dicing tape and a function of a die-bonding tape has been developed (for example, see Patent Literature 1).

In the dicing/die-bonding tape disclosed in Patent Literature 1, a die-bonding film is laminated on a releasing film, and a dicing tape is laminated on a die-bonding film. Then, in order to stick the dicing tape to a ring frame called a wafer ring used for dicing, the dicing tape is formed in a size larger than the die-bonding film so as to cover the die-bonding film.

Such a dicing/die-bonding tape is stored and carried as a roll in which the tape is wound on a cylindrical winding core.

CITATION LIST

Patent Literature

Patent Literature 1: JP 2007-002173 A

SUMMARY OF INVENTION

Technical Problem

However, in the above-described dicing/die-bonding tape, a step is formed in a boundary between a portion in which the die-bonding film and the dicing tape are laminated on the releasing film and a portion in which only the dicing tape is laminated on the releasing film. Further, a step is formed in a boundary between a portion in which only the dicing tape is laminated on the releasing film and a portion in which any one of the die-bonding film and the dicing tape is not laminated on the releasing film.

For this reason, when the dicing/die-bonding tape is wound on the winding core, these steps are transferred to the die-bonding film and the dicing tape, and hence a problem arises in that the transfer marks of the steps are formed on the die-bonding film and the dicing tape. Particularly, when the transfer mark is formed on the die-bonding film, a void is formed with respect to the semiconductor wafer. As a result, there is a possibility that the reliability of the semiconductor device may be degraded.

Therefore, a case may be considered in which a winding tension for winding the dicing/die-bonding tape on the winding core is decreased. However, when the winding tension is decreased, a problem arises in that a winding deviation of the dicing/die-bonding tape occurs when the roll is stored and carried in an upright state.

Furthermore, a dicing/die-bonding tape in which a die-bonding film and a dicing tape are integrated as a single film is also developed. However, since a step is formed even in such a dicing/die-bonding tape, the above-described problem occurs.

Therefore, an object of the invention is to provide a winding core and a roll capable of suppressing a transfer mark and preventing a winding deviation of an adhesive tape.

Solution to Problem

According to the invention, there is provided a winding core which has a cylindrical shape and on which an adhesive tape, formed by an adhesive layer formed on an elongated base film in the longitudinal direction of the base film, is wound as multiple layers, wherein the outer diameter of the winding core is a dimension in which a deviation amount of the adhesive layer in the circumferential direction of the winding core between adjacent inner and outer tape portions of the adhesive tape in the radial direction of the winding core becomes 55 mm or less when the adhesive tape is wound on the winding core.

According to the winding core of the invention, it is possible to suppress the deviation amount of the adhesive layer in the circumferential direction of the winding core between the inner tape portion and the outer tape portion of the adhesive tape wound on the winding core to 55 mm or less even when the winding tension for winding the adhesive tape on the winding core is not decreased. Accordingly, it is possible to suppress the transfer mark from being formed on the adhesive layer and to prevent the winding deviation of the adhesive tape. Particularly, in the adhesive tape used to produce the semiconductor device, the wafer is stuck to the center portion of the adhesive layer, and the wafer is not stuck to the peripheral edge of the adhesive layer. For this reason, since the deviation amount of the adhesive layer in the circumferential direction of the winding core between the inner tape portion and the outer tape portion is suppressed to 55 mm or less, it is possible to suppress the transfer mark from being formed on the center portion of the adhesive layer to which the wafer is stuck and to prevent the winding deviation of the adhesive tape. Furthermore, it is possible to improve the reliability of the semiconductor device produced by using the adhesive tape drawn out from the winding core.

In this case, in the invention, the outer diameter of the winding core may be a dimension in which the deviation amount of the adhesive layer in the circumferential direction of the winding core between the inner tape portion and the outer tape portion up to at least ten layers of the adhesive tape wound on the winding core becomes 55 mm or less.

When the adhesive tape is wound on the winding core in an overlapping state, the radius of the adhesive tape increases. For this reason, when the adhesive tape is long, there is a case where the deviation amount of the adhesive layer may exceed 55 mm if it goes away from the winding core in the radial direction even when the deviation amount of the adhesive layer near the winding core is suppressed to 55 mm. Meanwhile, when the adhesive tape is wound on the winding core by applying the same winding tension, the tension acting on the adhesive tape wound on the winding core increases as it goes inward in the radial direction, and hence the problem of the transfer mark becomes severe. However, since the tension acting on the adhesive tape wound on the winding core decreases as it goes outward in the radial direction, the problem of the transfer mark does not occur. Therefore, when the outer diameter of the winding core is set in this way so that the deviation amount of the adhesive layer in the circumferential direction of the winding core between the inner tape portion and the outer tape portion up to at least ten layers is suppressed to 55 mm or less, it is possible to suppress the transfer mark and to prevent the winding deviation of the adhesive tape regardless of the length of the adhesive tape.

Further, in the invention, when the pitch of the adhesive layer formed on the adhesive tape is indicated by P, the outer circumferential length of the winding core may be in the range of (P−55) mm to (P+55) mm.

When the outer circumferential length of the winding core is set in this way, one adhesive layer may be wound on the winding core by about one revolution so that one pitch of the adhesive layer is about one winding turn. For this reason, it is possible to set the deviation amount of the adhesive layer between the inner tape portion and the outer tape portion to the above-described range without increasing the outer diameter of the winding core too much.

Further, in the invention, the adhesive layer of the adhesive tape may include a first adhesive layer formed on the base film and a second adhesive layer formed on the base film so as to cover the first adhesive layer while having an area larger than the first adhesive layer, and the outer diameter of the winding core may be a dimension in which the peripheral edge of the first adhesive layer does not overlap the peripheral edge of the second adhesive layer between the inner tape portion and the outer tape portion when the adhesive tape is wound on the winding core.

Meanwhile, in the invention, the adhesive layer of the adhesive tape may include a second adhesive layer formed on the base film and a first adhesive layer formed on the second adhesive layer so that the second adhesive layer is exposed from the outer periphery thereof while having an area smaller than the second adhesive layer, and the outer diameter of the winding core may be a dimension in which the peripheral edge of the first adhesive layer does not overlap the peripheral edge of the second adhesive layer between the inner tape portion and the outer tape portion when the adhesive tape is wound on the winding core.

When the outer diameter of the winding core is set in this way, it is possible to prevent the peripheral edge of the first adhesive layer and the peripheral edge of the second adhesive layer from overlapping each other between the inner tape portion and the outer tape portion of the adhesive tape wound on the winding core. For this reason, it is possible to suppress the transfer mark from being formed on the first adhesive layer and to prevent the winding deviation of the adhesive tape even when the winding tension for winding the adhesive tape on the winding core is not decreased. Particularly, in the adhesive tape used to produce the semiconductor device, the wafer is stuck to the first adhesive layer, and the wafer is not stuck to the second adhesive layer covering the first adhesive layer. For this reason, since it is possible to prevent the peripheral edge of the first adhesive layer and the peripheral edge of the second adhesive layer from overlapping each other between the inner tape portion and the outer tape portion, it is possible to suppress the transfer mark from being formed on the first adhesive layer to which the wafer is stuck and to prevent the winding deviation of the adhesive tape. Accordingly, it is possible to improve the reliability of the semiconductor device produced by using the adhesive tape drawn out from the winding core.

In this case, in the invention, the outer diameter of the winding core may be a dimension in which the peripheral edge of the first adhesive layer does not overlap the peripheral edge of the second adhesive layer between the inner tape portion and the outer tape portion up to at least ten layers of the adhesive tape wound on the winding core.

In this way, since the outer diameter of the winding core is set so as to prevent the peripheral edge of the first adhesive layer and the peripheral edge of the second adhesive layer from overlapping each other between the inner tape portion and the outer tape portion up to at least ten layers, it is possible to suppress the transfer mark from being formed on the second adhesive layer to which the wafer is stuck and to prevent the winding deviation of the adhesive tape regardless of the length of the adhesive tape due to the above-described reason.

Further, in the invention, the outer diameter of the winding core may be 100 mm or more.

In this way, since the outer diameter of the winding core is set to 100 mm or more, it is possible to decrease the tension acting on the adhesive tape wound on the winding core even when the winding tension for winding the adhesive tape on the winding core is not decreased. Accordingly, it is possible to suppress the transfer mark from being formed on the adhesive layer and to prevent the winding deviation of the adhesive tape.

According to the invention, there is provided a roll in which an adhesive tape formed by a plurality of adhesive layers formed on an elongated base film in the longitudinal direction of the base film is wound as multiple layers on a cylindrical winding core, wherein the outer diameter of the winding core is a dimension in which the overlapping length of the adhesive layer in the circumferential direction of the winding core between adjacent inner and outer tape portions of the adhesive tape in the radial direction of the winding core becomes 55 mm or less when the adhesive tape is wound on the winding core.

According to the roll of the invention, the deviation amount of the adhesive layer in the circumferential direction of the winding core between the inner tape portion and the outer tape portion of the adhesive tape wound on the winding core is suppressed to 55 mm or less even when the winding tension for winding the adhesive tape on the winding core is not decreased. For this reason, it is possible to suppress the transfer mark from being formed on the adhesive layer and to prevent the winding deviation of the adhesive tape. In particular, in the adhesive tape used to produce the semiconductor device, the wafer is stuck to the center portion of the adhesive layer and the wafer is not stuck to the peripheral edge of the adhesive layer. For this reason, since the deviation amount of the adhesive layer in the circumferential direction of the winding core between the inner tape portion and the outer tape portion is suppressed to 55 mm or less, it is possible to suppress the transfer mark from being formed on the center portion of the adhesive layer to which the wafer is stuck and to prevent the winding deviation of the adhesive tape. Accordingly, it is possible to improve the reliability of the semiconductor device produced by using the adhesive tape drawn out from the winding core.

Advantageous Effects of Invention

According to the invention, it is possible to suppress the transfer mark and to prevent the winding deviation of the adhesive tape.

DESCRIPTION OF EMBODIMENTS

Hereinafter, a preferred embodiment of a winding core and a roll according to the invention will be described in detail with reference to the drawings. Furthermore, the same reference signs will be given to the same or equivalent components in all drawings.

Figure 1:
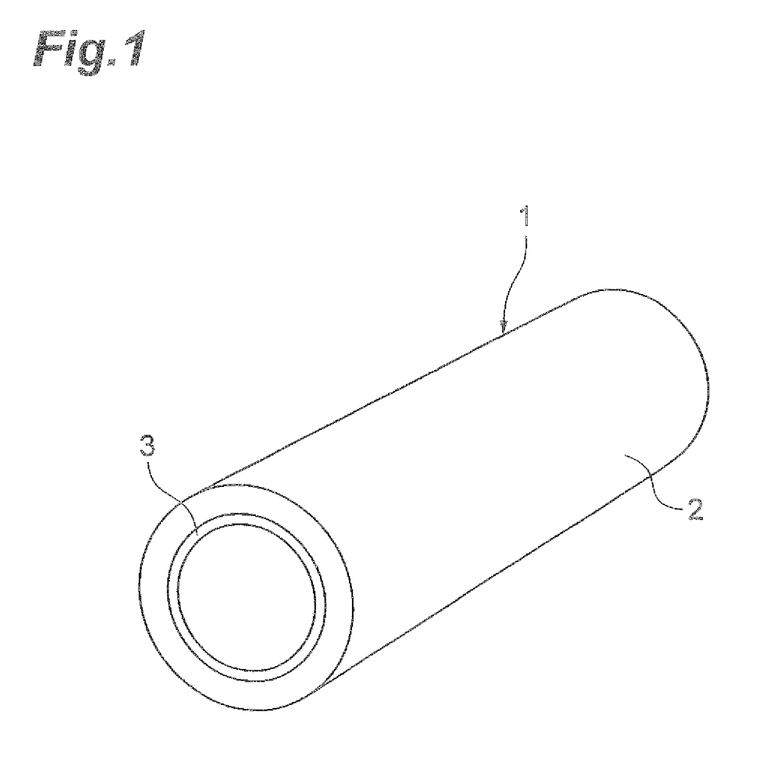
FIG. 1 is a perspective view of a roll according to an embodiment.

FIG. 1 is a perspective view of a roll according to the embodiment. As illustrated in FIG. 1, a roll 1 according to the embodiment has a structure in which an adhesive tape 2 is wound as multiple layers on a cylindrical winding core 3.

Figure 2:
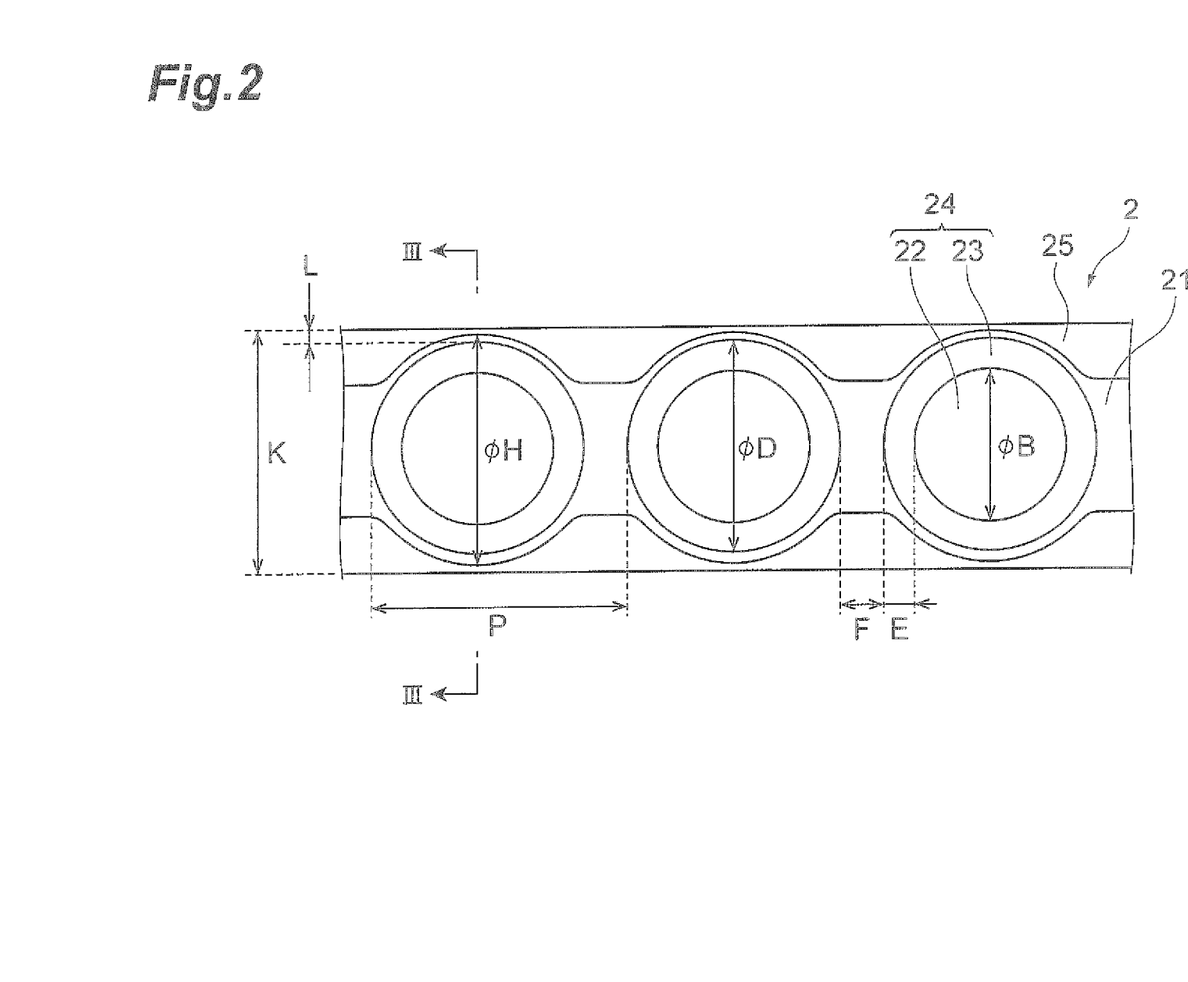
FIG. 2 is a top view illustrating a state where an adhesive tape is drawn out.
Figure 3:
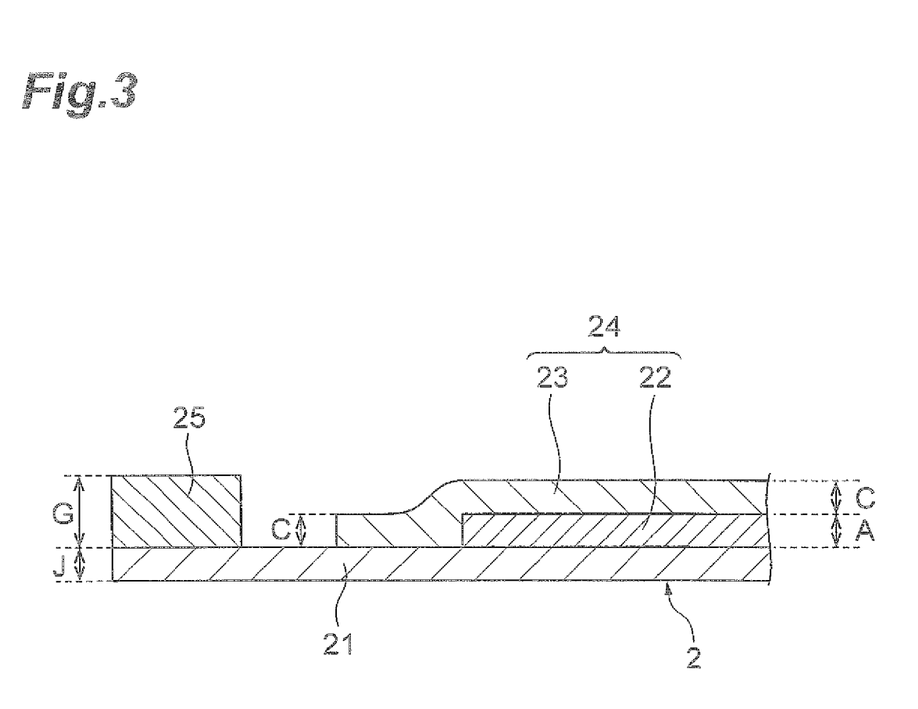
FIG. 3 is a cross-sectional view taken along the line III-III illustrated in FIG. 2.

FIG. 2 is a top view illustrating a state where the adhesive tape is drawn out. FIG. 3 is a cross-sectional view taken along the line III-III illustrated in FIG. 2. As illustrated in FIGS. 2 and 3, the adhesive tape 2 has a structure in which an adhesive layer 24 including a first adhesive layer 22 and a second adhesive layer 23 and a support layer 25 are laminated on an elongated releasing film 21.

The first adhesive layer 22 is a layer which serves as a die-bonding film. That is, the first adhesive layer 22 is stuck to a semiconductor wafer so that a semiconductor chip diced into a small piece is stuck and fixed to a die pad. For this reason, the first adhesive layer 22 is formed in a circular thin film shape. The composition of the adhesive contained in the first adhesive layer 22 is not particularly limited, but for example, epoxy resin, acrylic resin, phenol resin, polyimide resin, silicon resin, or the like may be used.

The layer thickness A of the first adhesive layer 22 may be set to be, for example, in the range of 1 μm to 250 μm and preferably in the range of 5 μm to 200 μm.

The diameter φB of the first adhesive layer 22 is larger than, for example, the diameter of the semiconductor wafer of the dicing target and is smaller than the inner diameter of the wafer ring. Furthermore, the inner diameter of the wafer ring is larger than the diameter of the semiconductor wafer of the dicing target. From the viewpoint of the reliable adhesion to the semiconductor wafer, it is preferable that the diameter φB of the first adhesive layer 22 be larger than the diameter of the semiconductor wafer of the dicing target by 20 mm or more. For example, when the diameter of the semiconductor wafer of the dicing target is 12 inch (300 mm) and the inner diameter of the wafer ring is 350 mm, the diameter φB of the first adhesive layer 22 may be set to be, for example, in the range of 300 mm to 350 mm, preferably in the range of 310 mm to 330 mm, and more preferably in the range of 319 mm to 321 mm.

The second adhesive layer 23 is a layer which serves as a dicing tape. That is, the second adhesive layer 23 is used to support the semiconductor wafer and to stick and fix the wafer ring during the dicing process. For this reason, the second adhesive layer 23 is formed in a circular thin film shape having an area larger than the first adhesive layer 22 so as to cover the first adhesive layer 22. The second adhesive layer 23 is not particularly limited, but an existing tape may be used as the dicing tape. The composition of the adhesive contained in the second adhesive layer 23 may be arbitrarily set as long as the adhesibility preventing the separation from the wafer ring is ensured. As the composition of the adhesive contained in the second adhesive layer 23, for example, chlorinated polypropylene resin, acrylic resin, polyester resin, polyurethane resin, epoxy resin, polyethylene, polypropylene, ethylene-propylene copolymer, polybutene-1, poly-4-methyl pentene-1, ethylene-vinyl acetate copolymer, ethylene-ethyl acrylate copolymer, ethylene-methyl acrylate copolymer, ethylene-acrylate copolymer, ionomer, styrene-ethylene-butene or pentene copolymer, polyamide-polyol copolymer, and the mixture of these may be used.

The layer thickness C of the second adhesive layer 23 may be set to be, for example, in the range of 1 μm to 250 μm and preferably in the range of 5 μm to 200 μm.

The diameter φD of the second adhesive layer 23 is larger than the inner diameter of the wafer ring. From the viewpoint of the reliable adhesion to the wafer ring, it is preferable that the diameter φD of the second adhesive layer 23 be sufficiently larger than the inner diameter of the wafer ring. For example, when the inner diameter of the wafer ring is 350 mm, the diameter φD of the second adhesive layer 23 may be set to be, for example, in the range of 360 mm to 375 mm, preferably in the range of 365 mm to 375 mm, and more preferably in the range of 369 mm to 371 mm.

Then, the adhesive layer 24 has a structure in which the first adhesive layer 22 and the second adhesive layer 23 are laminated in a concentric shape so that the first adhesive layer 22 is completely covered by the second adhesive layer 23 and is not exposed from the second adhesive layer 23. For this reason, the entire surface of the first adhesive layer 22 is stuck to the releasing film 21, and the peripheral edge of the second adhesive layer 23 is stuck to the releasing film 21 so as to surround the entire outer periphery of the first adhesive layer 22. Further, the thickness of the peripheral edge of the adhesive layer 24 becomes the thickness C of the second adhesive layer 23, and the thickness of the center portion of the adhesive layer 24 becomes the thickness (A+C) obtained by adding the thickness A of the first adhesive layer 22 and the thickness C of the second adhesive layer 23.

The separation distance B between the outer edge of the second adhesive layer 23 and the outer edge of the first adhesive layer 22 in the radial direction may be set to be, for example, 30 mm or more, preferably in the range of 30 mm to 80 mm, and more preferably in the range of 20 mm to 30 mm.

The adhesive layer 24 with this structure is formed as a plurality of sheets on the releasing film 21, and the adhesive layers 24 are disposed at the center portion of the releasing film 21 in the lateral direction at a constant pitch (interval) in the longitudinal direction of the releasing film 21.

The separation distance F of the adhesive layers 24 adjacent to each other in the longitudinal direction of the releasing film 21 may be set to be, for example, in the range of 0 mm to 18 mm, preferably in the range of 5 mm to 15 mm, and more preferably in the range of 6.5 mm to 10.5 mm.

The pitch P of the adhesive layers 24 in the longitudinal direction of the releasing film 21 may be set to be preferably in the range of 376.5 mm to 379.5 mm. Furthermore, the pitch P is a value which is obtained by adding the diameter φD of the adhesive layer 24 and the separation distance F between the adhesive layers 24 adjacent to each other in the longitudinal direction of the releasing film 21.

The support layer 25 is used to reduce the transfer after winding to the adhesive layer 24 when the adhesive tape 2 is wound on the winding core 3. The support layer 25 is formed in a portion other than the center portion of the releasing film 21 in the lateral direction so as to surround the periphery of the adhesive layer 24. Further, the support layer 25 extends continuously or intermittently in the longitudinal direction of the releasing film 21. The support layer 25 is not particularly limited, but for example, a layer having the same composition as the second adhesive layer 23 may be used.

The layer thickness G of the support layer 25 is not particularly limited, but may be set to be equal to or larger than the maximum layer thickness (A+C) of the adhesive layer 24 from the viewpoint of suppressing the transfer to the adhesive layer 24.

The inner diameter φH of the support layer 25 which surrounds the periphery of the adhesive layer 24 of the support layer 25 is larger than the diameter 4D of the second adhesive layer 23. For example, when the diameter φD of the second adhesive layer 23 is 370 mm, the inner diameter φH of the support layer 25 may be set to be, for example, in the range of 371 mm to 385 mm, preferably in the range of 373 mm to 380 mm, and more preferably in the range of 376 mm to 378 mm.

The releasing film 21 is used to support the adhesive layer 24 while being stuck thereto so as to be wound on the winding core 3. The releasing film 21 is not particularly limited, but for example, a base film such as a polyester film, a polypropylene film, a polyethyleneterephthalate film, a polyimide film, a polyetherimide film, a polyethernaphthalate film, and a polymethylpentene film may be used. If necessary, a surface treatment such as a primary coating treatment, a UV treatment, a corona discharge treatment, a polishing treatment, and an etching treatment may be performed on the base films.

The thickness J of the releasing film 21 may be set to be, for example, in the range of 10 μm to 200 μm and preferably in the range of 20 μm to 150 μm.

The width K of the releasing film 21 in the lateral direction is larger than the diameter φD of the second adhesive layer 23. For example, when the diameter φD of the second adhesive layer 23 is 370 mm, the width K of the releasing film 21 in the lateral direction may be set to be, for example, in the range of 380 mm to 410 mm, preferably in the range of 385 mm to 400 mm, and more preferably in the range of 388 mm to 392 mm.

The separation distance L between the second adhesive layer 23 and both edges of the releasing film 21 in the lateral direction in the line extending in the lateral direction of the releasing film 21 along the center of the second adhesive layer 23 may be set to be, for example, in the range of 5 mm to 15 mm, preferably in the range of 7 mm to 13 mm, and more preferably in the range of 8 mm to 12 mm. Furthermore, the separation distance L becomes the shortest distance between the second adhesive layer 23 and both edges of the releasing film 21 in the lateral direction.

Figure 4:
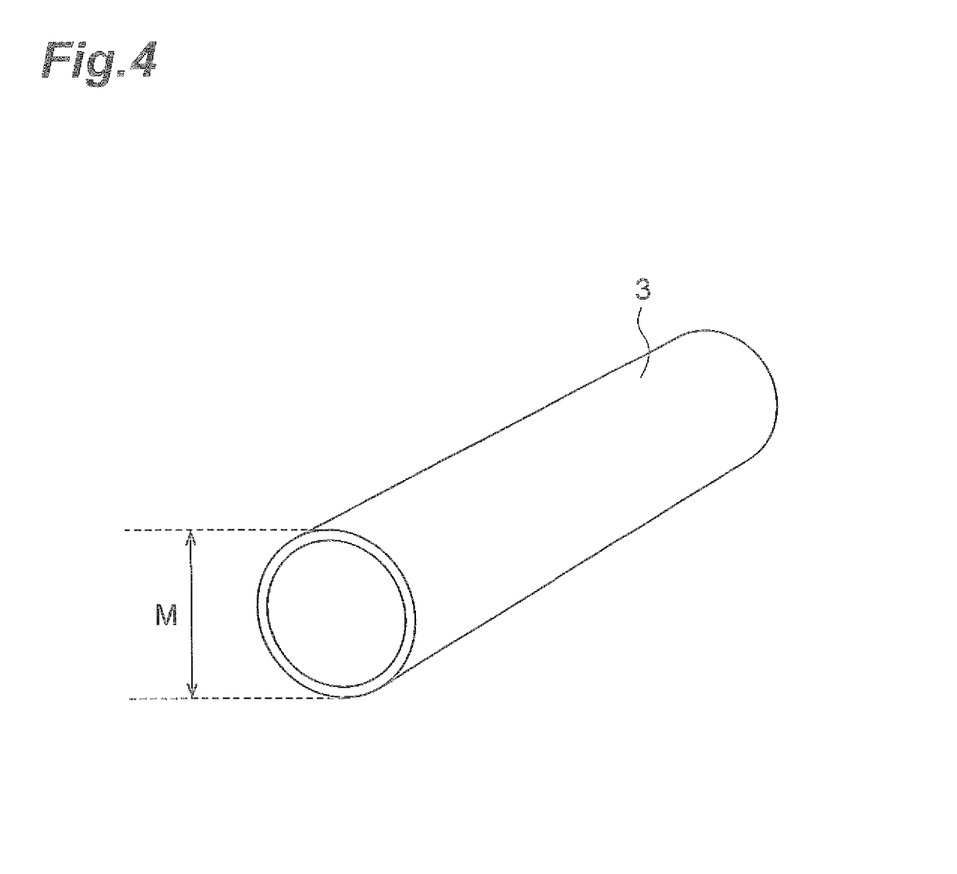
FIG. 4 is a perspective view of a winding core according to the embodiment.

FIG. 4 is a perspective view of the winding core according to the embodiment. As illustrated in FIG. 4, the winding core 3 is formed in a cylindrical shape. The composition of the winding core 3 is not particularly limited, but for example, plastic such as PS resin, PE resin, and ABS resin may be used.

Here, the outer diameter M and the outer circumferential length O of the winding core 3 will be described with reference to FIG. 5. The outer diameter M is the diameter of the outer periphery of the winding core 3. The outer circumferential length O is the circumferential length of the outer periphery of the winding core 3, and is obtained by the outer periphery M×π.

Figure 5:
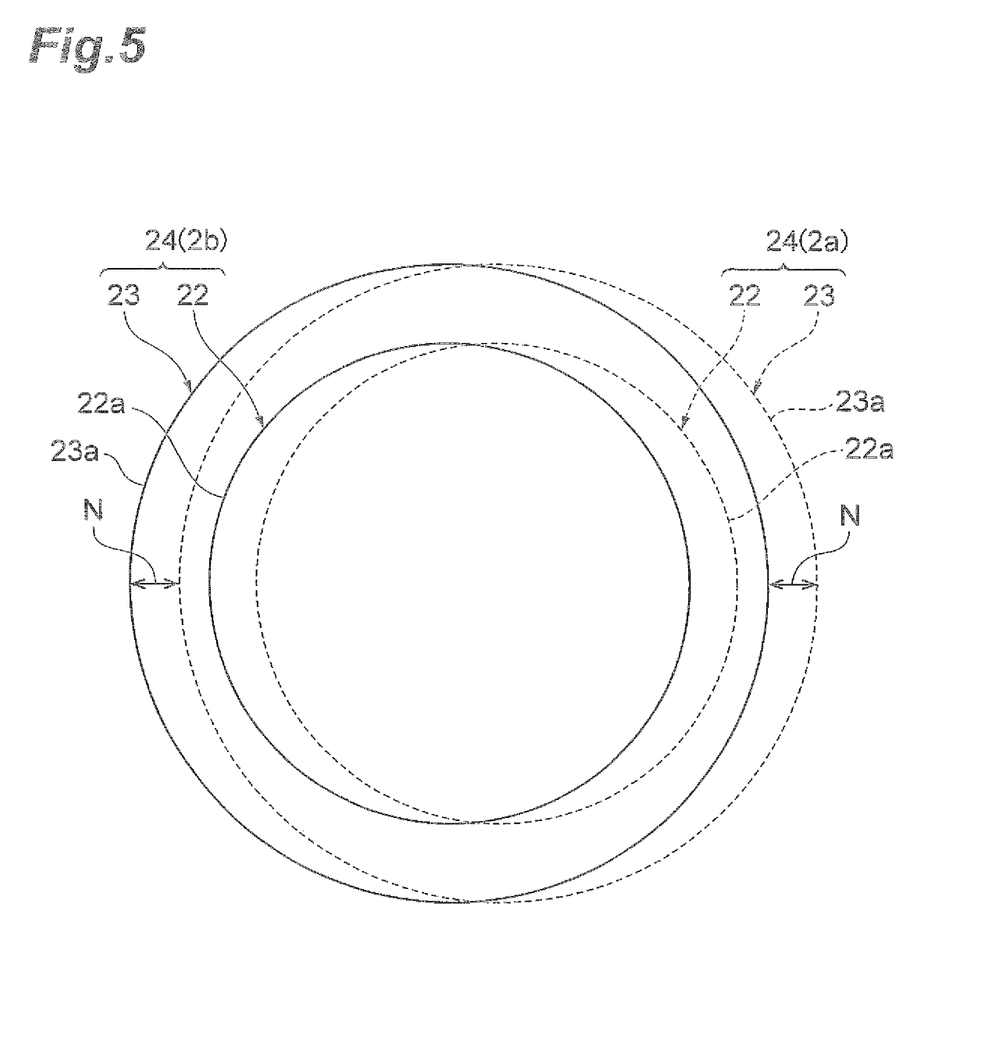
FIG. 5 is a schematic development view of an adhesive tape wound on the winding core.

FIG. 5 is a schematic development view of the adhesive tape wound on the winding core. Furthermore, in FIG. 5, the right and left direction (the arrow direction) becomes the circumferential direction of the winding core 3. As illustrated in FIGS. 4 and 5, the outer diameter M of the winding core 3 becomes a dimension in which the deviation amount N of the adhesive layer 24 in the circumferential direction of the winding core 3 becomes 55 mm or less between the adjacent inner and outer tape portions 2a and 2b of the adhesive tape 2 in the radial direction of the winding core 3 up to at least ten layers of the adhesive tape 2 wound on the winding core 3 when the adhesive tape 2 is wound as multiple layers on the winding core 3. Furthermore, the inner tape portion 2a is a portion which is disposed adjacent to the inner side (the lower layer side) of the outer tape portion 2b in the radial direction of the winding core 3, and the outer tape portion 2b is a portion which is disposed adjacent to the outer side (the upper layer side) of the inner tape portion 2a in the radial direction of the winding core 3. In this case, from the viewpoint of suppressing the transfer mark at the center portion of the adhesive layer 24, the outer diameter M of the winding core 3 becomes preferably a dimension in which the deviation amount N becomes 25 mm or less and becomes more preferably a dimension in which the deviation amount N becomes 15 mm or less.

For example, a case will be supposed in which the pitch P of the adhesive layer 24 is 378 mm. In this case, in the winding core 3 in which one pitch is about one winding turn, when the outer circumferential length O of the winding core 3 is set to be in the range of 323 mm (378 mm−55 mm) to 433 mm (378 mm+55 mm), the deviation amount N of the adhesive layer 24 in the circumferential direction of the winding core 3 may be set to 55 mm or less. In other words, when the outer diameter M of the winding core 3 is set to be in the range of 323/πmm (about 103 mm) to 433/πmm (about 138 mm), the deviation amount N of the adhesive layer 24 in the circumferential direction of the winding core 3 may be set to 55 mm or less. Furthermore, since it is possible to obtain the outer circumferential length O and the outer diameter M of the winding core 3 in which a plurality of pitches are about one winding turn by a simple calculation, the description thereof will be omitted herein.

As described above, in the adhesive tape 2 used for the production of the semiconductor device, the semiconductor wafer is stuck to (laminated on) the first adhesive layer 22 disposed at the center portion of the adhesive layer 24, and the semiconductor wafer is not stuck to the second adhesive layer 23 disposed at the peripheral edge of the adhesive layer 24. Therefore, since the outer diameter M and the outer circumferential length O of the winding core 3 are set in this way, it is possible to suppress the deviation amount N of the adhesive layer 24 in the circumferential direction of the winding core 3 to 55 mm or less, 25 mm or less, or 15 mm or less between the inner tape portion 2a and the outer tape portion 2b even when the winding tension for winding the adhesive tape 2 on the winding core 3 is not decreased. For this reason, it is possible to suppress the transfer mark at the center portion of the adhesive layer 24 to which the semiconductor wafer is stuck and to prevent the winding deviation of the adhesive tape 2. Accordingly, it is possible to improve the reliability of the semiconductor device produced by using the adhesive tape 2 drawn out from the winding core 3.

Incidentally, when the adhesive tape 2 is wound on the winding core 3 in an overlapping state, the radius of the adhesive tape 2 increases. For this reason, when the adhesive tape 2 is long, there is a case where the deviation amount N of the adhesive layer 24 may exceed 55 mm, 25 mm, and 15 mm if the adhesive layer moves away from the winding core 3 in the radial direction even when the deviation amount N of the adhesive layer 24 adjacent to the winding core 3 is suppressed to 55 mm or less, 25 mm or less, and 15 mm or less. Meanwhile, when the adhesive tape 2 is wound on the winding core 3 by the same winding tension, the tension acting on the adhesive tape 2 wound on the winding core 3 increases as it goes inward in the radial direction. For this reason, the problem of the transfer mark becomes severe, but since the tension acting on the adhesive tape 2 wound on the winding core 3 decreases as it goes outward in the radial direction, the problem of the transfer mark does not occur.

Therefore, since the outer diameter of the winding core 3 is set so that the deviation amount N of the adhesive layer 24 in the circumferential direction of the winding core 3 is suppressed to 55 mm or less, 25 mm or less, and 15 mm or less between the inner tape portion 2a and the outer tape portion 2b up to at least ten layers regardless of the length of the adhesive tape 2, it is possible to suppress the transfer mark and to prevent the winding deviation of the adhesive tape 2.

In this case, when the outer circumferential length O of the winding core 3 is set to be in the range of (P−55) mm to (P+55) mm, the range of (P−25) mm to (P+25) mm, and the range of (P−15) mm to (P+15) mm as expressed by the above-described detailed examples, one adhesive layer 24 may be wound on the winding core 3 by one revolution so that one pitch of the adhesive layer becomes about one winding turn when the pitch P of the adhesive layer 24 is indicated by P. For this reason, the deviation amount N of the adhesive layer 24 between the inner tape portion 2a and the outer tape portion 2b may be set to the above-described range without increasing the outer diameter of the winding core 3 too much.

Further, from the viewpoint of suppressing the transfer mark from being formed on the first adhesive layer 22, it is preferable that the outer diameter M of the winding core 3 become a dimension in which a peripheral edge 22a of the first adhesive layer 22 does not overlap a peripheral edge 23a of the second adhesive layer 23 between the inner tape portion 2a and the outer tape portion 2b when the adhesive tape 2 is wound on the winding core 3.

For example, a case will be supposed in which the diameter φB of the first adhesive layer 22 is 320 mm, the diameter φD of the second adhesive layer 23 is 370 mm, and the pitch P of the adhesive layer 24 is 378 mm. In this case, the separation distance E between the peripheral edge 22a of the first adhesive layer 22 and the peripheral edge 23a of the second adhesive layer 23 in the circumferential direction of the winding core 3 becomes 25 mm. Therefore, in the winding core 3 in which one pitch is about one winding turn, it is possible to prevent the peripheral edge 22a of the first adhesive layer 22 and the peripheral edge 23a of the second adhesive layer 23 from overlapping each other between the inner tape portion 2a and the outer tape portion 2b by setting the outer circumferential length O of the winding core 3 to a dimension larger than 353 mm (378 mm 25 mm) and smaller than 403 mm (378 mm+25 mm). In other words, when the outer diameter M of the winding core 3 is set to a dimension larger than 353/7 mm (about 112 mm) and smaller than 403/πmm (about 128 mm), it is possible to prevent the peripheral edge 22a of the first adhesive layer 22 and the peripheral edge 23a of the second adhesive layer 23 from overlapping each other between the inner tape portion 2a and the outer tape portion 2b. Furthermore, since it is possible to obtain the outer circumferential length O and the outer diameter M of the winding core 3 in which a plurality of pitches are about one winding turn by a simple calculation, the description thereof will be omitted herein.

When the outer circumferential length O and the outer diameter M of the winding core 3 are set in this way, it is possible to prevent the peripheral edge of the first adhesive layer 22 and the peripheral edge of the second adhesive layer 23 from overlapping each other between the inner tape portion 2a and the outer tape portion 2b of the adhesive tape 2 wound on the winding core 3. For this reason, it is possible to suppress the transfer mark from being formed on the first adhesive layer 22 to which the semiconductor wafer is stuck and to prevent the winding deviation of the adhesive tape 2 even when the winding tension for winding the adhesive tape 2 on the winding core 3 is not decreased. Accordingly, it is possible to improve the reliability of the semiconductor device produced by using the adhesive tape 2 drawn out from the winding core 3.

Further, it is preferable that the outer diameter M of the winding core 3 be 100 mm or more from the viewpoint of suppressing the winding deviation of the adhesive tape 2. In this case, 140 mm or less is preferable, 130 mm or less is more preferable, and 120 mm or less is particularly preferable.

When the outer diameter M of the winding core 3 is set to 100 mm or more in this way, it is possible to decrease the tension acting on the adhesive tape 2 wound on the winding core 3 even when the winding tension for winding the adhesive tape 2 on the winding core 3 is not decreased. Accordingly, it is possible to suppress the transfer mark from being formed on the adhesive layer 24 and to prevent the winding deviation of the adhesive tape 2.

Meanwhile, when the outer diameter M of the winding core 3 is set to be 140 mm or less, 130 mm or less, and 120 mm or less, it is possible to more easily carry and store the roll 1.

While the preferred embodiment of the invention has been described hereinbefore, the invention is not limited to the above-described embodiment.

Figure 6:
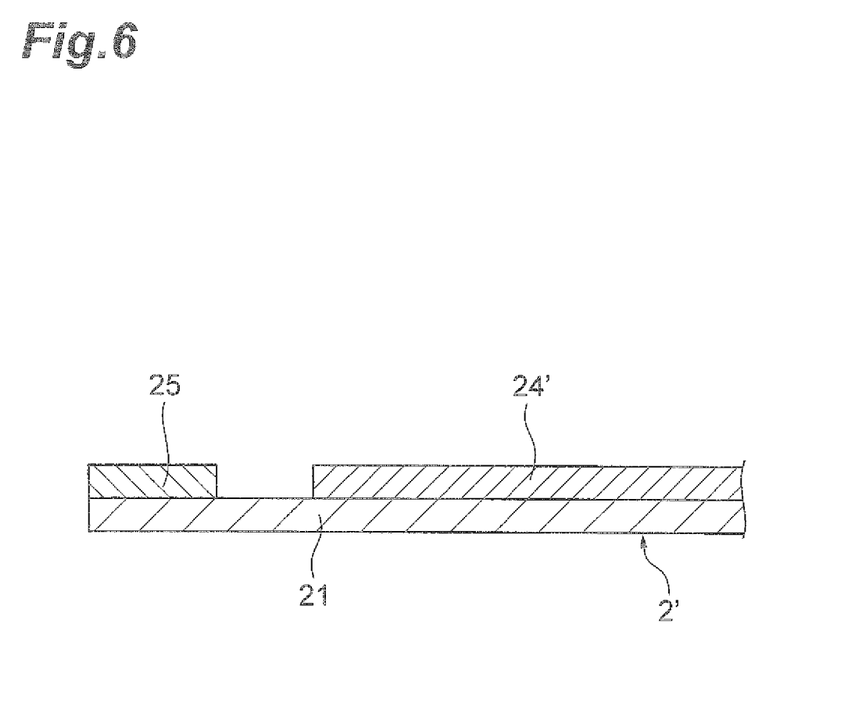
FIG. 6 is a cross-sectional view illustrating another example of the adhesive tape.

For example, in the above-described embodiment, a case has been described in which the adhesive layer which is laminated on the releasing film includes two layers, the first adhesive layer and the second adhesive layer, but the adhesive layer may be a single layer as in an adhesive layer 24' of an adhesive tape 2' illustrated in FIG. 6. The adhesive layer 24' may be only, for example, the first adhesive layer or the second adhesive layer. Alternatively, the adhesive layer may be a single layer obtained by integrating the first adhesive layer and the second adhesive layer. Even in this structure, the same operation and effect as those of the embodiment may be obtained.

Figure 7:
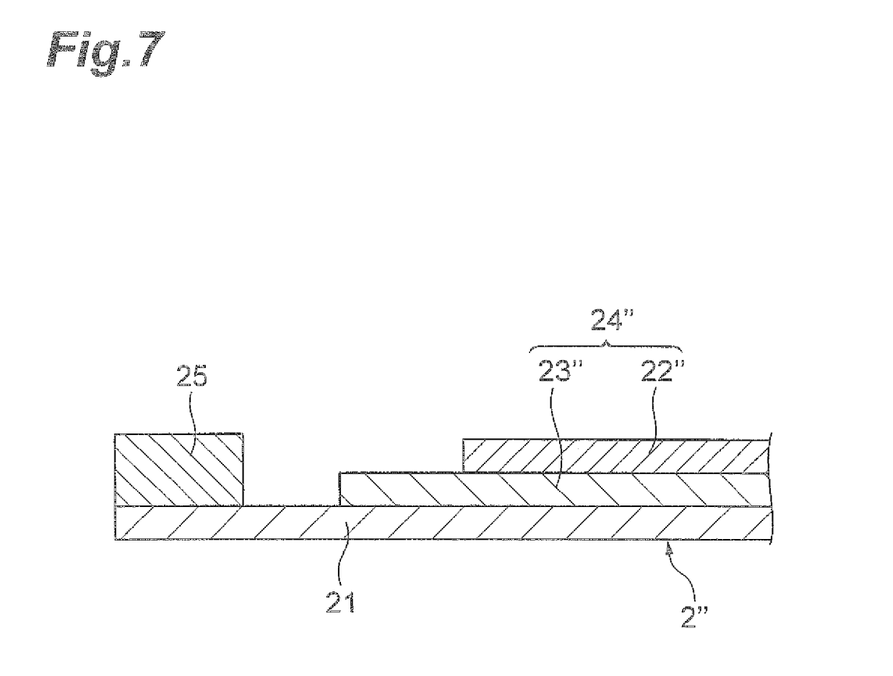
FIG. 7 is a cross-sectional view illustrating still another example of the adhesive tape.

Further, in the above-described embodiment, a case has been described in which the adhesive layer laminated on the releasing film is formed so that the second adhesive layer is laminated on the first adhesive layer, but a first adhesive layer 22" may be laminated on a second adhesive layer 23" as in an adhesive layer 24" of an adhesive tape 2" illustrated in FIG. 7. In this case, the second adhesive layer 23" is formed on the base film 21, and the first adhesive layer 22" is formed on the second adhesive layer 23" so that the second adhesive layer 23" is exposed from the outer periphery thereof while having an area smaller than the second adhesive layer 23". Then, the outer diameter of the winding core is set to a dimension in which the peripheral edge of the first adhesive layer 22″ does not overlap the peripheral edge of the second adhesive layer 23″ between the inner tape portion and the outer tape portion when the adhesive tape 2″ is wound on the winding core. Even in this structure, the same operation and effect as those of the embodiment may be obtained.

Further, in the above-described embodiment, the condition of the deviation amount of the adhesive layer and the condition in which the peripheral edge of the first adhesive layer overlaps the peripheral edge of the second adhesive layer have been described in the state where the adhesive tape is wound on the winding core by at least ten layers, but the adhesive tape may be wound on the winding core by a few layers smaller than ten layers.

Further, in the above-described embodiment, a case has been described in which the adhesive tape is a dicing/die-bonding tape including the first adhesive layer serving as the die-bonding film and the second adhesive layer serving as the dicing tape, but the adhesive layers may be selected appropriately in response to the use purposes or the like.

EXAMPLE

Next, examples of the invention will be described. Furthermore, the invention is not limited to the examples to be described below.

Example 1

As an adhesive tape, a dicing/die-bonding tape having a product name of "FH-4013 series" and produced by Hitachi Chemical Co., Ltd. was used. A die-bonding film having a diameter of 320 mm and a layer thickness of 135 μm was formed on a first adhesive layer, and a dicing tape having a diameter of 370 mm and a layer thickness of 120 μm was formed on a second adhesive layer. Further, a separation distance between the outer edge of the first adhesive layer and the outer edge of the second adhesive layer was 25 mm, and the pitch of the adhesive layer was 378 mm.

As a winding core, an ABS resinous winding core having an outer diameter of 100 mm and an outer circumferential length of 314 mm was produced by ABS resin. A roll w s produced by winding the above-described adhesive tape on the winding core produced so that one pitch of the adhesive layer was about one winding turn. The winding tension for winding the adhesive tape on the winding core was set to 18 N, 20 N, and 22 N.

The adhesive tape wound on the winding core was formed so that the deviation amount of the adhesive layer in the circumferential direction of the winding core was 42.6 mm or less between the inner tape portion and the outer tape portion up to at least ten layers.

Then, the produced roll was stored for two weeks in a cold state, a lamination was performed at a temperature of 60° C. and a speed of 10 mm/sec, and then the evaluation of a transfer mark and the evaluation of a winding deviation were performed. In the evaluation of the transfer mark, a case with the void caused by the transfer mark was indicated by C, and a case without the void caused by the transfer mark was indicated by A. In the evaluation of the winding deviation, a case without the winding deviation was indicated by A, a case with the winding deviation not causing any problem was indicated by B, and a case with the winding deviation was indicated by C. The evaluation results are illustrated in Table 1 below.

Example 2

The condition was the same as that of Example 1 except that the outer diameter of the winding core was 114 mm.

In the adhesive tape wound on the winding core, the deviation amount of the adhesive layer in the circumferential direction of the winding core between the inner tape portion and the outer tape portion was 1.1 mm or less up to at least ten layers.

Then, the evaluation of the transfer mark and the evaluation of the winding deviation were performed similarly to Example 1. The evaluation results are illustrated in Table 1 below.

Example 3

The condition was the same as that of Example 1 except that the outer diameter of the winding core was 120 mm.

In the adhesive tape wound on the winding core, the deviation amount of the adhesive layer in the circumferential direction of the winding core between the inner tape portion and the outer tape portion up to at least ten layers was 16.8 mm or less.

Then, the evaluation of the transfer mark and the evaluation of the winding deviation were performed similarly to Example 1. The evaluation results are illustrated in Table 1 below.

Comparative Example

The condition was the same as that of Example 1 except that the outer diameter of the winding core was 84.0 mm.

Furthermore, the winding core having an outer diameter of 84.0 mm is generally used in the market.

In the adhesive tape wound on the winding core, the deviation amount of the adhesive layer in the circumferential direction of the winding core between the inner tape portion and the outer tape portion up to at least ten layers was 89.1 mm or less.

Then, the evaluation of the transfer mark and the evaluation of the winding deviation were performed similarly to Example 1. The evaluation results are illustrated in Table 1 below.

As illustrated in Table 1, in Comparative Example, the transfer mark was formed when the winding tension was not decreased to 18 N. However, in any one of Examples 1 to 3, the transfer mark was not formed even when the winding tension was increased to 22 N. Further, in Comparative Example, the winding deviation occurred when the winding tension was decreased to 18 N in order to suppress the transfer mark. However, in any one of Examples 1 to 3, the winding deviation substantially did not occur even when the winding tension was decreased to 18 N. In conclusion, it is considered that the number of times of winding the adhesive sheet is decreased by setting the outer diameters of the winding cores in Examples 1 to 3 to be larger than that of Comparative Example.

TABLE 1

|  | Example 1 | | | Example 2 | | | Example 3 | | | Comparative Example | | |
| --- | --- | --- | --- | --- | --- | --- | --- | --- | --- | --- | --- | --- |
| Outer diameter of winding core | 100 mm | | | 114 mm | | | 120 mm | | | 84.0 mm | | |
| Outer circumferential length of winding core | 314 mm | | | 358 mm | | | 377 mm | | | 264 mm | | |
| Pitch of adhesive layer | 378 mm | | | 378 mm | | | 378 mm | | | 378 mm | | |
| Deviation amount of adhesive layer | 42.6 mm | | | 1.1 mm | | | 16.8 mm | | | 89.1 mm | | |
| Winding tension [N] | 18 | 20 | 22 | 18 | 20 | 22 | 18 | 20 | 22 | 18 | 20 | 22 |
| Evaluation of transfer mark | A | A | A | A | A | A | A | A | A | A | C | C |
| Evaluation of winding deviation | B | B | A | B | A | A | A | A | A | C | B | A |

REFERENCE SIGNS LIST

1 Roll
2 Adhesive tape
2a Inner tape portion
2b Outer tape portion
3 Winding core
21 Releasing film (base film)
22 First adhesive layer
22a Peripheral edge of first adhesive layer
23 Second adhesive layer
23a Peripheral edge of second adhesive layer
24 Adhesive layer
25 Support layer

The invention claimed is:

1. A roll, comprising:
a winding core which has a cylindrical shape; and
an adhesive tape comprising a plurality of adhesive layers provided on an elongated base film in a longitudinal direction of the base film, adjacent adhesive layers in the longitudinal direction of the base film being separated by a separation distance, the adhesive tape being wound around the winding core in multiple layers, the wound adhesive tape having an inner tape layer and an outer tape layer adjacent to each other in a radial direction of the winding core,
wherein an outer diameter of the winding core is of a dimension such that the adhesive layer provided on the inner tape layer and the adhesive layer provided on the outer tape layer are offset by 55 mm or less in a circumferential direction of the winding core.

2. The roll according to claim 1,
wherein the outer diameter of the winding core is of a dimension such that the adhesive layer provided on an inner tape layer and the adhesive layer provided on an adjacent outer tape layer are offset by 55 mm or less in the circumferential direction of the winding core up to at least a tenth layer from the winding core of the adhesive tape wound on the winding core.

3. The roll according claim 2,
wherein each of the adhesive layers of the adhesive tape includes a first adhesive layer formed on the base film and a second adhesive layer formed on the base film so as to cover the first adhesive layer while having an area larger than the first adhesive layer, and
wherein the outer diameter of the winding core is a dimension in which the peripheral edge of the first adhesive layer does not overlap the peripheral edge of the second adhesive layer between the inner tape layer and the outer tape layer.

4. The roll according to claim 1,
wherein when the pitch of the adhesive layers formed on the adhesive tape is indicated by P, the outer circumferential length of the winding core is in the range of (P−55) mm to (P+55) mm.

5. The roll according claim 4,
wherein each of the adhesive layers of the adhesive tape includes a first adhesive layer formed on the base film and a second adhesive layer formed on the base film so as to cover the first adhesive layer while having an area larger than the first adhesive layer, and
wherein the outer diameter of the winding core is a dimension in which the peripheral edge of the first adhesive layer does not overlap the peripheral edge of the second adhesive layer between the inner tape layer and the outer tape layer.

6. The roll according claim 1,
wherein each of the adhesive layers of the adhesive tape includes a first adhesive layer formed on the base film and a second adhesive layer formed on the base film so as to cover the first adhesive layer while having an area larger than the first adhesive layer, and
wherein the outer diameter of the winding core is of a dimension such that the peripheral edge of the first adhesive layer does not overlap the peripheral edge of the second adhesive layer between the inner tape layer and the outer tape layer.

7. The roll according to claim 6,
wherein the outer diameter of the winding core is of a dimension such that the peripheral edge of the first adhesive layer does not overlap the peripheral edge of the second adhesive layer between the inner tape layer and the outer tape layer up to at least ten layers of the adhesive tape wound on the winding core.

8. The roll according to claim 1,
wherein each of the adhesive layers of the adhesive tape includes a second adhesive layer formed on the base film and a first adhesive layer formed on the second adhesive layer so that the second adhesive layer is exposed from the outer periphery thereof while having an area smaller than the second adhesive layer, and
wherein the outer diameter of the winding core is a dimension in which the peripheral edge of the first adhesive layer does not overlap the peripheral edge of the second adhesive layer between the inner tape layer and the outer tape layer.

9. The roll according to claim 8,
wherein the outer diameter of the winding core is a dimension such that the peripheral edge of the first adhesive layer does not overlap the peripheral edge of the second adhesive layer between the inner tape layer and the outer tape layer up to at least ten layers of the adhesive tape wound on the winding core.

10. The roll according to claim 1,
wherein the outer diameter of the winding core is 100 mm or more.

* * * * *